US012548445B2

(12) United States Patent
Beaurepaire et al.

(10) Patent No.: US 12,548,445 B2
(45) Date of Patent: Feb. 10, 2026

(54) METHOD TO LEARN PARKING RESTRICTIONS BASED ON PARKING BEHAVIORS OF RELIABLE PARKERS

(71) Applicant: HERE GLOBAL B.V., Eindhoven (NL)

(72) Inventors: Jerome Beaurepaire, Nantes (FR); Leon Stenneth, Chicago, IL (US); Jeremy Michael Young, Beverly Hills, MI (US)

(73) Assignee: HERE GLOBAL B.V., Eindhoven (NL)

(*) Notice: Subject to any disclaimer, the term of this patent is extended or adjusted under 35 U.S.C. 154(b) by 169 days.

(21) Appl. No.: 18/544,498

(22) Filed: Dec. 19, 2023

(65) Prior Publication Data

US 2025/0201123 A1    Jun. 19, 2025

(51) Int. Cl.
*G08G 1/14* (2006.01)
*G08G 1/01* (2006.01)

(52) U.S. Cl.
CPC .......... *G08G 1/145* (2013.01); *G08G 1/0129* (2013.01)

(58) Field of Classification Search
CPC .............................. G08G 1/145; G08G 1/0129
USPC ...................................................... 340/932.2
See application file for complete search history.

(56) References Cited

U.S. PATENT DOCUMENTS

| | | | |
|---|---|---|---|
| 9,141,582 B1 * | 9/2015 | Brinkmann | G07C 5/02 |
| 9,177,475 B2 | 11/2015 | Sellschopp | |
| 9,202,376 B1 * | 12/2015 | Evans | G08G 1/148 |
| 9,514,651 B2 | 12/2016 | Linder et al. | |
| 9,595,194 B1 * | 3/2017 | Tuxen | G08G 1/143 |
| 9,704,392 B2 * | 7/2017 | Wang | G08G 1/0112 |
| 9,766,625 B2 | 9/2017 | Boroditsky et al. | |
| 10,163,347 B2 * | 12/2018 | Neystadt | G08G 1/165 |
| 11,402,223 B1 * | 8/2022 | Grealish-Rust | G01C 21/3685 |

(Continued)

FOREIGN PATENT DOCUMENTS

| | | |
|---|---|---|
| CN | 113611148 A | 11/2021 |
| DE | 102020211235 A1 | 3/2022 |

OTHER PUBLICATIONS

Sonntag et al. "A Machine Learning Approach to Infer On-Street Parking Occupancy Based on Parking Meter Transactions", IEEE 23rd International Conference on Intelligent Transportation Systems (ITSC), Sep. 20-23, 2020, 6 pages.

(Continued)

*Primary Examiner* — James J Yang
*Assistant Examiner* — Thang D Tran
(74) *Attorney, Agent, or Firm* — Jeffrey R. Moisan; HERE GLOBAL B.V.

(57) ABSTRACT

A system to learn parking restrictions of a region based on parking behaviors of vehicle parkers is disclosed. The system is configured for determining one or more contextual factors related to a user parking a vehicle in the region; computing a parking trust index based on the one or more contextual factors related to a user parking a vehicle in a region; classifying the user as a reliable parker if the parking trust index is greater than a reliability threshold and classifying the user as an unreliable parker if the parking trust index is less than a reliability threshold; and determining the parking restrictions of the area based on a parking behavior of the reliable parker and/or a parking behavior of the unreliable parker.

11 Claims, 6 Drawing Sheets

(56) References Cited

U.S. PATENT DOCUMENTS

| | | | | |
|---|---|---|---|---|
| 2002/0005779 | A1* | 1/2002 | Ishii | B62D 15/027 |
| | | | | 340/436 |
| 2011/0140927 | A1* | 6/2011 | Lee | G08G 1/207 |
| | | | | 340/993 |
| 2012/0081219 | A1* | 4/2012 | Schiebahn | B60Q 9/004 |
| | | | | 340/435 |
| 2014/0266800 | A1* | 9/2014 | Koukoumidis | G08G 1/0129 |
| | | | | 340/932.2 |
| 2015/0029041 | A1* | 1/2015 | Liu | G07F 17/24 |
| | | | | 340/932.2 |
| 2015/0123818 | A1* | 5/2015 | Sellschopp | G08G 1/096844 |
| | | | | 340/932.2 |
| 2016/0328965 | A1* | 11/2016 | Safer | H04L 67/025 |
| 2017/0124874 | A1* | 5/2017 | Cai | G08G 1/04 |
| 2017/0140649 | A1* | 5/2017 | Di Censo | G08G 1/09623 |
| 2017/0330460 | A1* | 11/2017 | Massey | G08G 1/146 |
| 2017/0364821 | A1* | 12/2017 | Mathur | G06N 5/01 |
| 2018/0108255 | A1* | 4/2018 | Hetz | G08G 1/147 |
| 2018/0165962 | A1* | 6/2018 | Neystadt | G08G 1/0962 |
| 2018/0215374 | A1* | 8/2018 | Lee | G05D 1/12 |
| 2020/0143682 | A1* | 5/2020 | Chow | G07B 15/02 |
| 2021/0192560 | A1* | 6/2021 | Wang | G06Q 50/01 |
| 2021/0304604 | A1* | 9/2021 | Roherty | G08G 1/20 |
| 2021/0316719 | A1* | 10/2021 | Lin | B60W 50/14 |
| 2022/0005140 | A1* | 1/2022 | Beaurepaire | G06F 16/9535 |
| 2022/0053283 | A1* | 2/2022 | Beaurepaire | H04W 4/029 |
| 2022/0065633 | A1* | 3/2022 | Beaurepaire | G01C 21/343 |
| 2022/0065652 | A1* | 3/2022 | Herman | G01C 21/3685 |
| 2022/0092979 | A1* | 3/2022 | Gambella | G01C 21/3685 |
| 2022/0122456 | A1* | 4/2022 | Beaurepaire | G06Q 50/265 |
| 2022/0136847 | A1* | 5/2022 | Higuchi | G01C 21/3461 |
| | | | | 340/932.2 |
| 2022/0153258 | A1* | 5/2022 | Arechiga-Gonzalez | |
| | | | | G08G 1/147 |
| 2023/0025490 | A1* | 1/2023 | Koiji | B60W 30/06 |
| 2024/0054895 | A1* | 2/2024 | Zhou | G08G 1/146 |
| 2024/0203255 | A1* | 6/2024 | Young | G08G 1/147 |

OTHER PUBLICATIONS

"IEEE 802.11" Wikipedia, Retrieved on Nov. 20, 2023, Webpage available at https://en.wikipedia.org/wiki/IEEE_802.11.

"IEEE 802.16" Wikipedia, Retrieved on Nov. 20, 2023, Webpage available at https://en.wikipedia.org/wiki/IEEE_802.16.

* cited by examiner

METHOD TO LEARN PARKING RESTRICTIONS BASED ON PARKING BEHAVIORS OF RELIABLE PARKERS

TECHNOLOGICAL FIELD

An example aspect of the present disclosure generally relates to learning parking patterns, and more particularly, but without limitation relates to a system, a method, and a computer program product to learn parking restrictions based on parking behaviors of reliable parkers.

BACKGROUND

In ever-growing cities of all sizes, parking restrictions multiply in number and restrictiveness, limiting available parking and subjecting parking violators to fines or towing. Drivers might not be aware of all the parking restrictions in a new area or country. Many of those on-street parking restrictions are also available in most mapping and navigation services. Some other restrictions are just too complex to understand when user is late for an appointment. Therefore there is a need to leverage all possible means to get more accurate and fresh information about on street parking restrictions. A system to learn parking restrictions based on past historical parking behaviors of reliable parkers may be leveraged to identify areas with parking restrictions without learning about them upon arrival to an area.

BRIEF SUMMARY

The present disclosure provides a system, a method and a computer program product to learn parking restrictions of a region based on parking behaviors of vehicle parkers, in accordance with various aspects.

Aspects of the disclosure provide a system to learn parking restrictions of a region based on parking behaviors of vehicle parkers is disclosed. The system is configured for determining one or more contextual factors related to a user parking a vehicle in the region; computing a parking trust index based on the one or more contextual factors related to a user parking a vehicle in a region; classifying the user as a reliable parker if the parking trust index is greater than a reliability threshold and classifying the user as an unreliable parker if the parking trust index is less than a reliability threshold; and determining the parking restrictions of the area based on a parking behavior of the reliable parker and/or a parking behavior of the unreliable parker.

Aspects of the disclosure provide a computer-implemented method to learn parking restrictions of a region based on parking behaviors of vehicle parkers. The method includes determining one or more contextual factors related to a user parking a vehicle in the region; computing a parking trust index based on the one or more contextual factors related to a user parking a vehicle in a region; classifying the user as a reliable parker if the parking trust index is greater than a reliability threshold and classifying the user as an unreliable parker if the parking trust index is less than a reliability threshold; and determining the parking restrictions of the area based on a parking behavior of the reliable parker and/or a parking behavior of the unreliable parker.

Aspects of the disclosure provide a computer program product. The computer program product may include a non-transitory computer readable medium having stored thereon computer executable instructions, which when executed by one or more processors, cause the one or more processors to carry out operations to learn parking restrictions of a region based on parking behaviors of vehicle parkers, the operations may include determining one or more contextual factors related to a user parking a vehicle in the region; computing a parking trust index based on the one or more contextual factors related to a user parking a vehicle in a region; classifying the user as a reliable parker if the parking trust index is greater than a reliability threshold and classifying the user as an unreliable parker if the parking trust index is less than a reliability threshold; and determining the parking restrictions of the area based on a parking behavior of the reliable parker and/or a parking behavior of the unreliable parker.

The foregoing summary is illustrative only and is not intended to be in any way limiting. In addition to the illustrative aspects, aspects, and features described above, further aspects, aspects, and features will become apparent by reference to the drawings and the following detailed description.

BRIEF DESCRIPTION OF THE DRAWINGS

Figure 1:
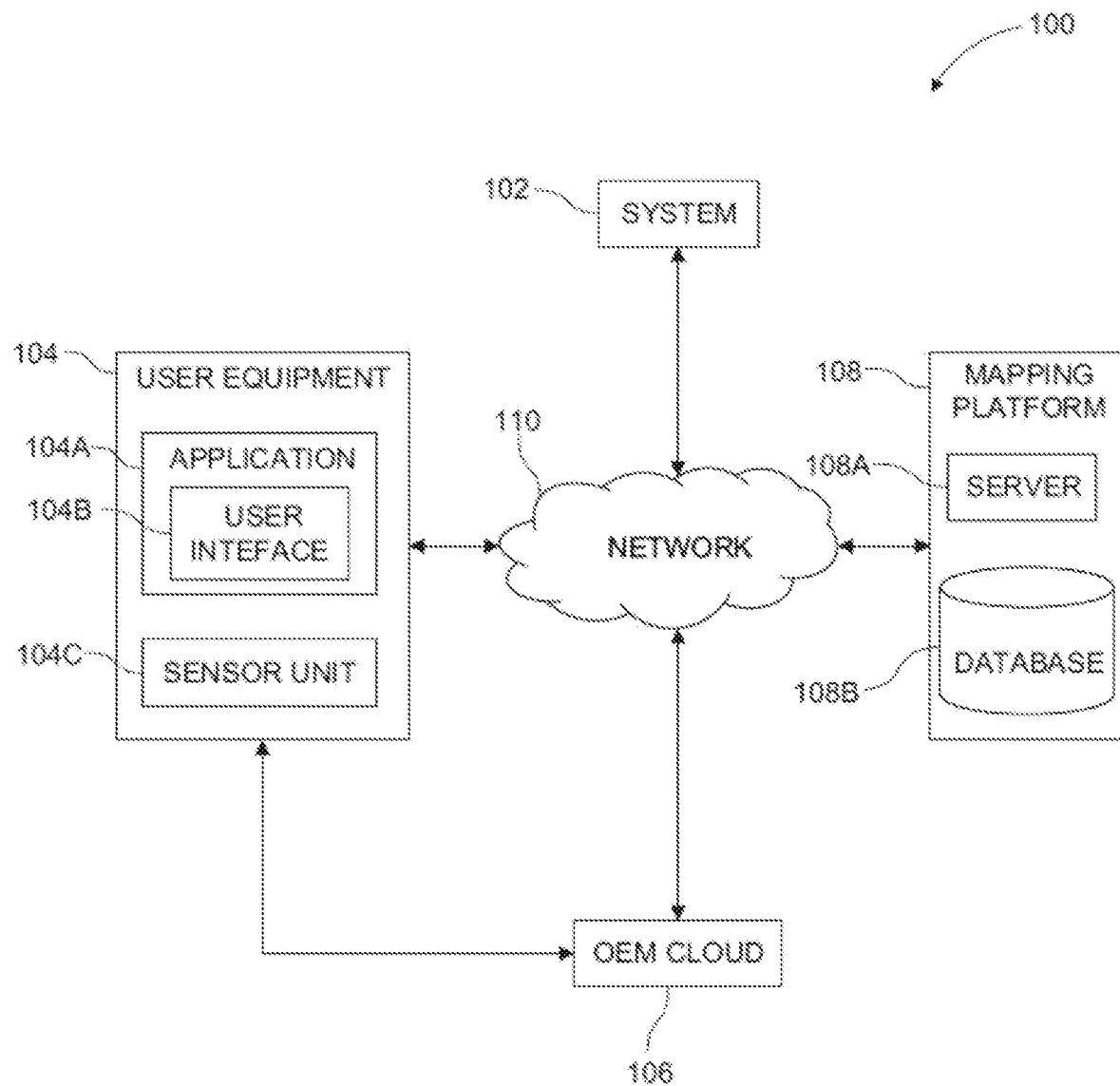
Figure 2:
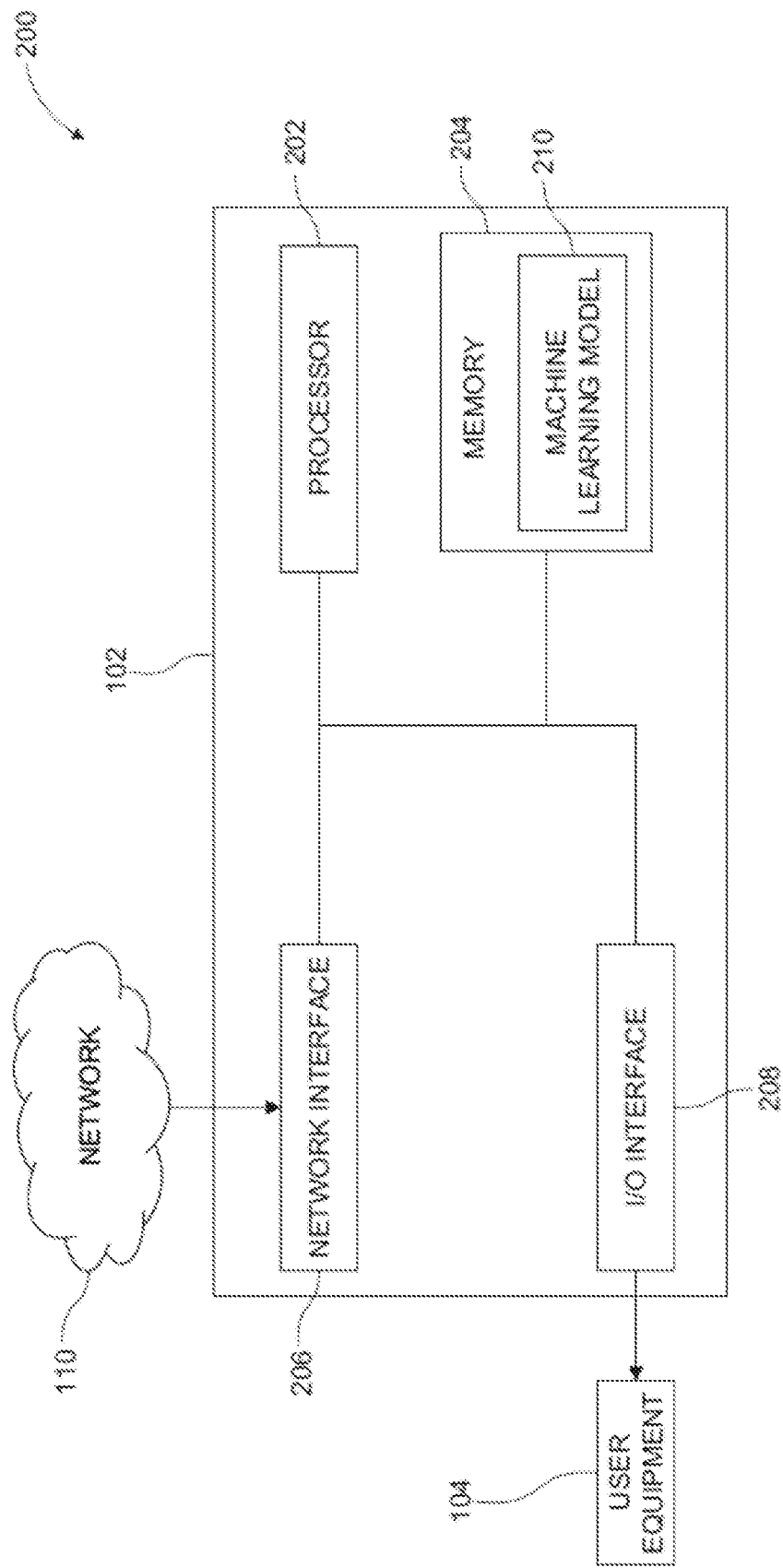
Figure 3:
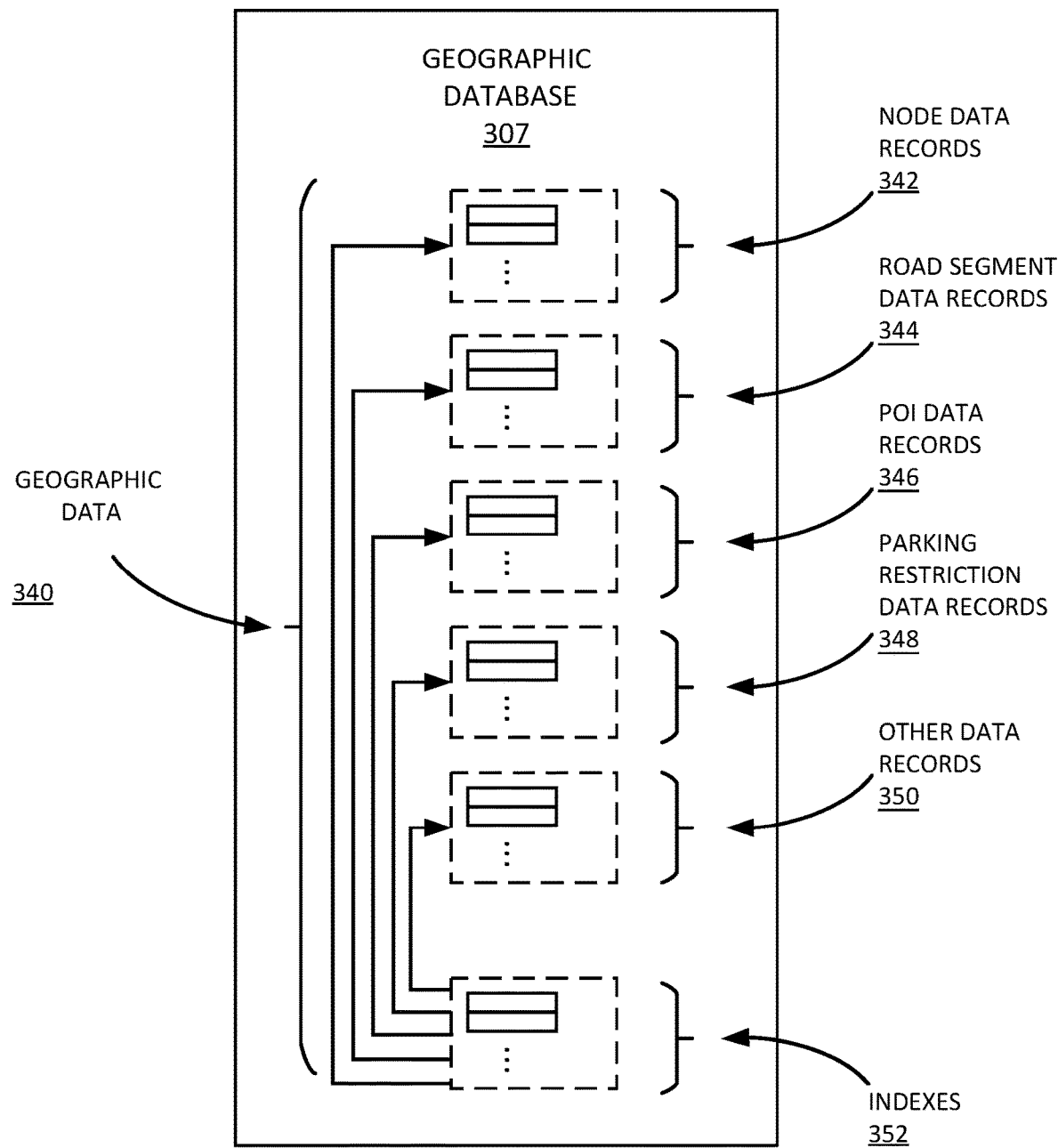
Figure 4:
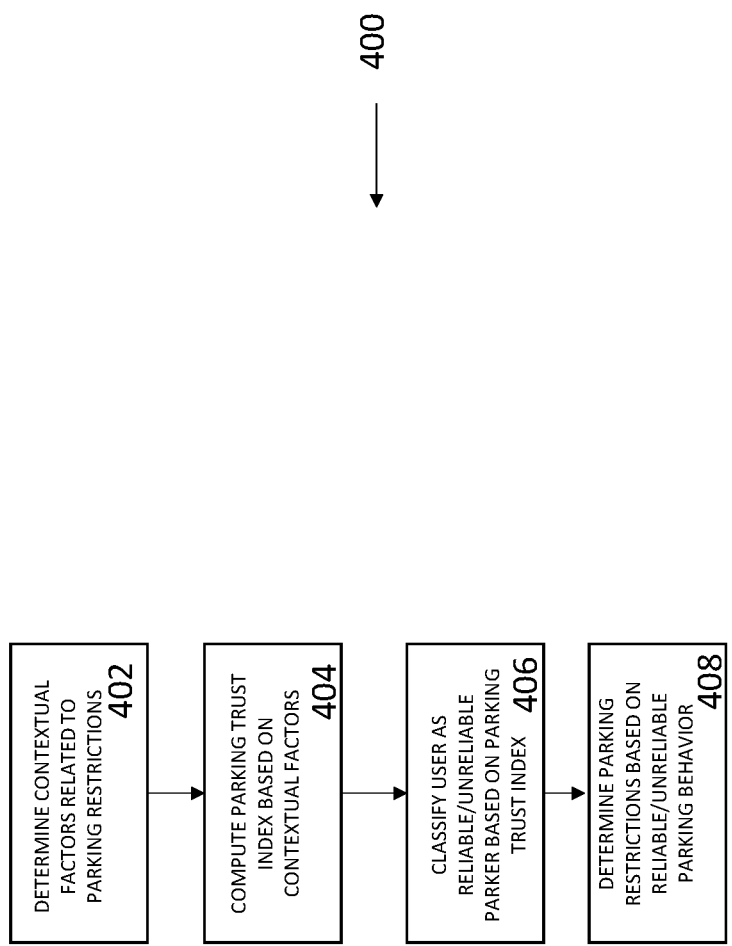

Having thus described certain aspects of the disclosure in general terms, reference will now be made to the accompanying drawings, which are not necessarily drawn to scale, and wherein:

FIG. 1 illustrates a schematic diagram of a network environment 100 of a system 102 for learning parking restrictions of a region based on parking behaviors of vehicle parkers, in accordance with an example aspect;

FIG. 2 illustrates a block diagram of the system for learning parking restrictions of a region based on parking behaviors of vehicle parkers, in accordance with an example aspect;

FIG. 3 illustrates an example the map or geographic database for use by the system for learning parking restrictions of a region based on parking behaviors of vehicle parkers, in accordance with an example aspect; and FIG. 4 illustrates a flowchart 400 for acts taken in an exemplary method for learning parking restrictions of a region based on parking behaviors of vehicle parkers, in accordance with an aspect.

Figure 5A:
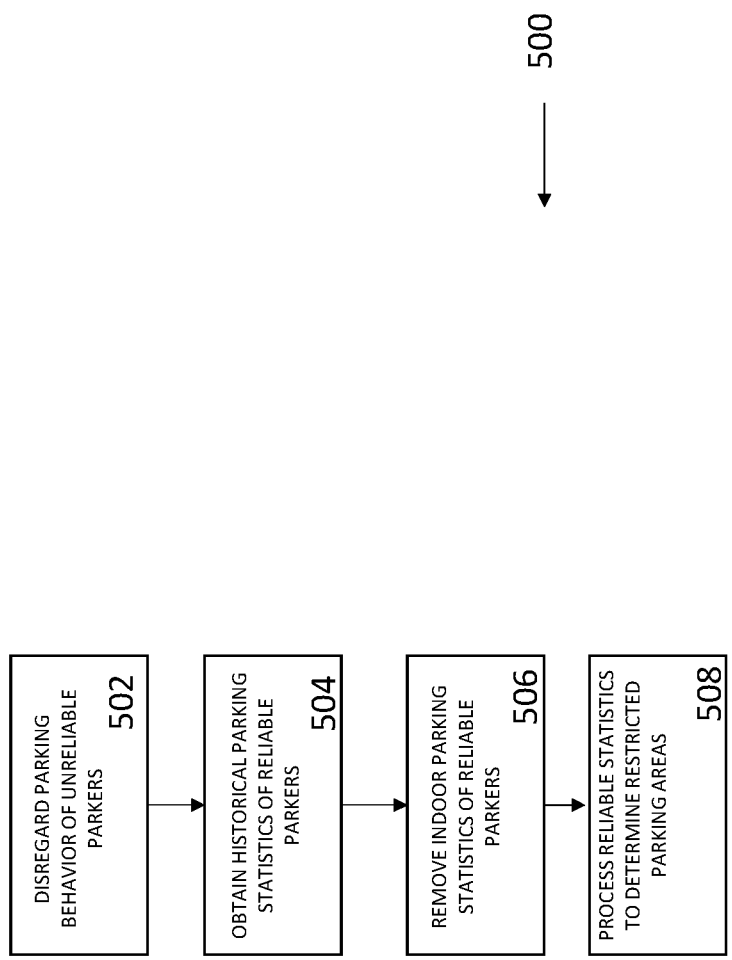

FIG. 5A illustrates another flowchart 500 for acts taken in an exemplary method for learning parking restrictions of a region based on parking behaviors of vehicle parkers, in accordance with an aspect.

Figure 5B:
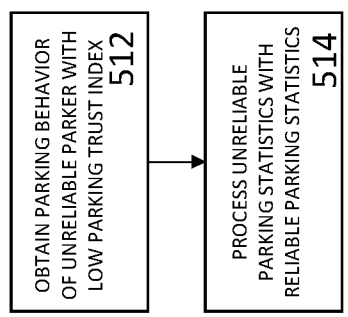

FIG. 5B illustrates another flowchart 500 for acts taken in an exemplary method for learning parking restrictions of a region based on parking behaviors of vehicle parkers, in accordance with an aspect.

DETAILED DESCRIPTION

Some aspects of the present disclosure will now be described more fully hereinafter with reference to the accompanying drawings, in which some, but not all, aspects are shown. Indeed, various aspects may be embodied in many different forms and should not be construed as limited to the aspects set forth herein; rather, these aspects are provided so that this disclosure will satisfy applicable legal requirements. Like reference numerals refer to like elements throughout. As used herein, the terms "data", "content," "information," and similar terms may be used interchangeably to refer to data capable of being transmitted, received and/or stored in accordance with aspects of the present disclosure. Thus, use of any such terms should not be taken to limit the spirit and scope of aspects of the present disclosure.

For purposes of this disclosure, though not limiting or exhaustive, "vehicle" refers to standard gasoline powered vehicles, hybrid vehicles, an electric vehicle, a fuel cell vehicle, and/or any other mobility implement type of vehicle (e.g., bikes, scooters, etc.). The vehicle includes parts related to mobility, such as a powertrain with an engine, a transmission, a suspension, a driveshaft, and/or wheels, etc. The vehicle may be a non-autonomous vehicle or an autonomous vehicle. The term autonomous vehicle (AV) may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to lane marking indicators (lane marking type, lane marking intensity, lane marking color, lane marking offset, lane marking width, or other characteristics) and driving commands or navigation commands. In one aspect, the vehicle may be assigned with an autonomous level. An autonomous level of a vehicle can be a Level 0 autonomous level that corresponds to a negligible automation for the vehicle, a Level 1 autonomous level that corresponds to a certain degree of driver assistance for the vehicle, a Level 2 autonomous level that corresponds to partial automation for the vehicle, a Level 3 autonomous level that corresponds to conditional automation for the vehicle, a Level 4 autonomous level that corresponds to high automation for the vehicle, a Level 5 autonomous level that corresponds to full automation for the vehicle, and/or another sub-level associated with a degree of autonomous driving for the vehicle.

The disclosed system, method and computer program product attempts to learn parking restrictions based on knowledge of how people respect parking restrictions. The core principle is to identify reliable parkers and unreliable parkers in order to leverage the data generated by those users afterwards.

To potentially achieve that, system computes a Parking Trust Index based on contextual factors related to parking restrictions in an area, such as a number of successful parking events in the region, on-street parking availability, a number of tickets received for parking violations, a number of times vehicles have been towed for parking violations, a number of vehicle damage incidents related to parking violations (such as stickers put on car, damages/scratches, windshield scrappers moved up by unhappy pedestrians, etc) or a combination thereof.

For a given user parking a vehicle in a region with potential parking restrictions, the system may compute a parking trust index, indicative of the reliability/unreliability of the user for future evaluation of this data to determine regions with parking restrictions.

For example, if the parking trust index is >a reliability threshold, the system may classify the user as a reliable parker. If the parking trust index is <the reliability threshold, the system may classify the user as an unreliable parker. The reliability threshold may take into account local parking regulations, geographic and city features and other variables that impact parking in a region. In an aspect, the parking trust index may account for a grey area between the two binary extremes of reliable/unreliable, where drivers are not tagged as reliable or unreliable.

In an aspect, the reliability threshold value can be defined locally by the system to take local rules into account or by an authority.

In an aspect of the disclosure, the system may learn parking restrictions in an area based on reliable parkers by removing data related to unreliable parkers. The system may, in an aspect, disregard the parking behavior of the unreliable parkers. The system may obtain historical parking statistics of the reliable parkers instead. The system may remove indoor parking statistics of the reliable parker from the historical parking statistics of the reliable parker to calculate reliable parking statistics. This eliminates indoor parking incidents to separate from on-street parking, which may be more relevant to a parker trying to learn parking restrictions on the street. The system may then process the reliable parking statistics to determine restricted street parking areas.

The system may then conduct data mining on the reliable parking statistics to determine areas where the reliable drivers are not parking. In an aspect, these effectively become the areas where street parking is restricted. In an aspect, the system may appoint higher confidence of a parking restriction if no vehicle has ever parked at the location.

In a further aspect of the disclosure, the system may leverage unreliable parker data as well as reliable parker data. The system, in an aspect, may include the parking behavior of unreliable parkers, especially those with a low parking trust index, to obtain unreliable parking statistics. The system may include the reliable parking statistics along with process the unreliable parking statistics to determine restricted street parking areas.

The data processing may be similar to the approach using only reliable parking statistics, but data from all unreliable parkers is used here as well, especially when those unreliable parkers have a very low Parking Trust Index, as this means that they almost always park at improper locations.

It may occur that some jobs do not allow users to find proper parking spaces in a busy area due to the emergency of the situation (e.g., emergency doctors, water leakage, etc) while some others "can't afford" to take the time to park properly due to intensity of the job (e.g. deliveries). Some others are just careless and always take the first randomly available spot, with the risk of getting a fine. The approach of including some unreliable parking data may aim to identify those spots taken by "careless" drivers.

If data shows that those spots are only taken by those "careless" drivers, then they are very likely not proper parking spots and drivers should be careful when parking there.

In an aspect, the system may leverage mobility graph (MG) data (historical mobility patterns) and could accommodate the user's historical patterns to determine a user's likelihood to break rules, e.g. over speed, parking in areas not permitted. In an aspect, this could provide another level of analysis for the system to build the Parking Trust Index, and may be derived from a wider Driving Trust Index related to the respect of the driving rules.

In addition to that, in an aspect, the MG could also be used to identify the usual parking spots that a user is generally going to. In an aspect, trust levels may be based on user's familiarity within an area. Based on user's MG data, the system would be able to identify where users are in their home areas or familiar areas, versus when they are in vacations or in unfamiliar areas. A users' parking behavior patterns may be trusted in home area but not when s/he goes in vacation, and therefore the system should differentiate those behaviors when necessary and relevant. The system may then compute the parking trust index based on the mobility graph by assigning a higher weight to parking in a local area of the user when computing the parking trust index.

The system may consider additional contextual factors in learning parking restrictions. For example, the system may determine the reason for the restriction (fire hydrant, tow zone). In an aspect, the system may automatically classify the parking restriction based on these commonly present restricted parking situations, including location to a stop sign, emergency parking in front of hospitals, handicap parking, drop off areas at airports and the like.

In an aspect, the system could detect in the data that some careless drivers would not mind parking badly in most places, except in front of fire hydrant or other highly restricted areas, given the heightened fines or towing that may result for parking in those restricted areas. Ultimately, the system may also learn about parking restriction hours based on such patterns, if enough data is aggregated, based on the same patterns of parking.

FIG. 1 illustrates a schematic diagram of a network environment 100 of a system 102 to learn parking restrictions of a region based on parking behaviors of vehicle parkers in accordance with an example aspect. The system 102 may be communicatively coupled with, a user equipment (UE) 104, an OEM cloud 106, a mapping platform 108, via a network 110. The UE 104 may be a vehicle electronics system, onboard automotive electronics/computers, a mobile device such as a smartphone, tablet, smart watch, smart glasses, laptop, wearable device or other UE platforms known to one of skill in the art. The mapping platform 108 may further include a server 108A and a database 108B. The user equipment includes an application 104A, a user interface 104B, and a sensor unit 104C. Further, the server 108A and the database 108B may be communicatively coupled to each other.

The system 102 may comprise suitable logic, circuitry, interfaces and code that may be configured to process the sensor data obtained from the UE 104 for point of interest features or weather conditions in a region, that may be used to assist a user or driver to learn parking restrictions of a region based on parking behaviors of vehicle parkers. Such features can also include a vehicle location, a vehicle heading, a timestamp, an impact intensity or a combination thereof.

The system 102 may be communicatively coupled to the UE 104, the OEM cloud 106, and the mapping platform 108 directly via the network 110. Additionally, or alternatively, in some example aspects, the system 102 may be communicatively coupled to the UE 104 via the OEM cloud 106 which in turn may be accessible to the system 102 via the network 110.

All the components in the network environment 100 may be coupled directly or indirectly to the network 110. The components described in the network environment 100 may be further broken down into more than one component and/or combined together in any suitable arrangement. Further, one or more components may be rearranged, changed, added, and/or removed. Furthermore, fewer or additional components may be in communication with the system 102, within the scope of this disclosure.

The system 102 may be embodied in one or more of several ways as per the required implementation. For example, the system 102 may be embodied as a cloud-based service or a cloud-based platform. As such, the system 102 may be configured to operate outside the UE 104. However, in some example aspects, the system 102 may be embodied within the UE 104. In each of such aspects, the system 102 may be communicatively coupled to the components shown in FIG. 1 to carry out the desired operations and wherever required modifications may be possible within the scope of the present disclosure.

The UE 104 may be a vehicle electronics system, onboard automotive electronics/computers, a mobile device such as a smartphone, tablet, smart watch, smart glasses, laptop, wearable device and the like that is portable in itself or as a part of another portable/mobile object, such as, a vehicle known to one of skill in the art. The UE 104 may comprise a processor, a memory and a network interface. The processor, the memory and the network interface may be communicatively coupled to each other. In some example aspects, the UE 104 may be associated, coupled, or otherwise integrated with a vehicle of the user, such as an advanced driver assistance system (ADAS), a personal navigation device (PND), a portable navigation device, an infotainment system and/or other device that may be configured to provide route guidance and navigation related functions to the user. In such example aspects, the UE 104 may comprise processing means such as a central processing unit (CPU), storage means such as on-board read only memory (ROM) and random access memory (RAM), acoustic sensors such as a microphone array, position sensors such as a GPS sensor, gyroscope, a LIDAR sensor, a proximity sensor, motion sensors such as accelerometer, a display enabled user interface such as a touch screen display, and other components as may be required for specific functionalities of the UE 104. Additional, different, or fewer components may be provided. For example, the UE 104 may be configured to execute and run mobile applications such as a messaging application, a browser application, a navigation application, and the like. In accordance with an aspect, the UE 104 may be directly coupled to the system 102 via the network 110. For example, the UE 104 may be a dedicated vehicle (or a part thereof) for gathering data for development of the map data in the database 108B. In some example aspects, the UE 104 may be coupled to the system 102 via the OEM cloud 106 and the network 110. For example, the UE 104 may be a consumer mobile phone (or a part thereof) and may be a beneficiary of the services provided by the system 102. In some example aspects, the UE 104 may serve the dual purpose of a data gatherer and a beneficiary device. The UE 104 may be configured to provide sensor data to the system 102. In accordance with an aspect, the UE 104 may process the sensor data for information that may be used to learn parking restrictions of a region based on parking behaviors of vehicle parkers, such as weather, traffic conditions, community alerts, emergency alerts, etc. Further, in accordance with an aspect, the UE 104 may be configured to perform processing related to learn parking restrictions of a region based on parking behaviors of vehicle parkers.

The UE 104 may include the application 104A with the user interface 104B to access one or more applications. The application 104B may correspond to, but not limited to, map related service application, navigation related service application and location-based service application. In other words, the UE 104 may include the application 104A with the user interface 104B. The user interface 104B may be a dedicated user interface configured to show potential locations or contexts of parking restrictions in an area. The user interface 104B may be in the form of a map depicting regions of high or low risk of parking restrictons, according to aspects of the disclosure.

The sensor unit 104C may be embodied within the UE 104. The sensor unit 104C comprising one or more sensors may capture sensor data, in a certain geographic location. In accordance with an aspect, the sensor unit 104C may be built-in, or embedded into, or within interior of the UE 104. The one or more sensors (or sensors) of the sensor unit 104C may be configured to provide the sensor data comprising location data associated with a location of a user. In accordance with an aspect, the sensor unit 104C may be configured to transmit the sensor data to an Original Equipment Manufacturer (OEM) cloud. Examples of the sensors in the sensor unit 104C may include, but not limited to, a microphone, a camera, an acceleration sensor, a gyroscopic sensor, a LIDAR sensor, a proximity sensor, and a motion sensor.

The sensor data may refer to sensor data collected from a sensor unit 104C in the UE 104. In accordance with an aspect, the sensor data may be collected from a large number of mobile phones. In accordance with an aspect, the sensor data may refer to the point cloud data. The point cloud data may be a collection of data points defined by a given coordinates system. In a 3D coordinates system, for instance, the point cloud data may define the shape of some real or created physical objects. The point cloud data may be used to create 3D meshes and other models used in 3D modelling for various fields. In a 3D Cartesian coordinates system, a point is identified by three coordinates that, taken together, correlate to a precise point in space relative to a point of origin. The LIDAR point cloud data may include point measurements from real-world objects or photos for a point cloud data that may then be translated to a 3D mesh or NURBS or CAD model. In accordance with an aspect, the sensor data may be converted to units and ranges compatible with the system 102, to accurately receive the sensor data at the system 102. Additionally, or alternately, the sensor data of a UE 104 may correspond to movement data associated with a user of the user equipment. Without limitations, this may include motion data, position data, orientation data with respect to a reference and the like.

The mapping platform 108 may comprise suitable logic, circuitry, interfaces and code that may be configured to store map data associated with a geographic area in the region of interest related to parking restrictions, such as, for example, fire hydrants, construction zones, emergency locations, hospital parking, etc. The map data may include traffic features and include historical (or static) traffic features such as road layouts, pre-existing road networks, business, educational and recreational locations, POI locations, historical and real-time weather conditions in the region or a combination thereof. The server 108A of the mapping platform 108 may comprise processing means and communication means. For example, the processing means may comprise one or more processors configured to process requests received from the system 102 and/or the UE 104. The processing means may fetch map data from the database 108B and transmit the same to the system 102 and/or the UE 104 in a suitable format. In one or more example aspects, the mapping platform 108 may periodically communicate with the UE 104 via the processing means to update a local cache of the map data stored on the UE 104. Accordingly, in some example aspects, map data may also be stored on the UE 104 and may be updated based on periodic communication with the mapping platform 108.

In an aspect, the map data may include, and the database 108B of the mapping platform 108 may store real-time, dynamic data about road features to learn parking restrictions of a region based on parking behaviors of vehicle parkers. For example, real-time data may be collected to learn parking restrictions of a region based on parking behaviors of vehicle parkers, such as weather, POI events, traffic information, construction, emergency alerts etc. Other data records may include computer code instructions and/or algorithms for executing a trained machine learning model that is capable of assisting to learn parking restrictions of a region based on parking behaviors of vehicle parkers.

The database 108B of the mapping platform 108 may store map data of one or more geographic regions that may correspond to a city, a province, a country or of the entire world. The database 108B may store point cloud data collected from the UE 104. The database 108B may store data such as, but not limited to, node data, road segment data, link data, point of interest (POI) data, link identification information, and heading value records. The database 108B may also store cartographic data, routing data, and/or maneuvering data. According to some example aspects, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities for identifying location of building.

Optionally, the database 108B may contain path segment and node data records, such as shape points or other data that may represent raised features and vehicle speed control indications, links or areas in addition to or instead of the vehicle road record data. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The database 108B may also store data about the POIs and their respective locations in the POI records. The database 108B may additionally store data about places, such as cities, towns, or other communities, and other geographic features such as bodies of water, and mountain ranges. Such place or feature data can be part of the POI data or can be associated with POIs or POI data records (such as a data point used for displaying or representing a position of a city). In addition, the database 108B may include event data (e.g., traffic incidents, construction activities, scheduled events, unscheduled events, accidents, diversions etc.) associated with the POI data records or other records of the database 108B. Optionally or additionally, the database 108B may store 3D building maps data (3D map model of objects) of structures, topography and other visible features surrounding roads and streets, including parking restrictions known in the region.

The database 108B may be a master map database stored in a format that facilitates updating, maintenance, and development. For example, the master map database or data in the master map database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the UE 104. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received map database in a delivery format to produce one or more compiled navigation databases.

As mentioned above, the database 108B may be a master geographic database, but in alternate aspects, the database 108B may be embodied as a client-side map database and may represent a compiled navigation database that may be used in or with end user devices (such as the UE 104) to provide navigation and/or map-related functions. In such a case, the database 108B may be downloaded or stored on the end user devices (such as the UE 104).

The network 110 may comprise suitable logic, circuitry, and interfaces that may be configured to provide a plurality of network ports and a plurality of communication channels for transmission and reception of data, such as the sensor data, map data from the database 108B, etc. Each network port may correspond to a virtual address (or a physical machine address) for transmission and reception of the communication data. For example, the virtual address may be an Internet Protocol Version 4 (IPv4) (or an IPv6 address) and the physical address may be a Media Access Control (MAC) address. The network 110 may be associated with an application layer for implementation of communication protocols based on one or more communication requests from at least one of the one or more communication devices. The communication data may be transmitted or received, via the communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

Examples of the network 110 may include, but is not limited to a wireless channel, a wired channel, a combination of wireless and wired channel thereof. The wireless or wired channel may be associated with a network standard which may be defined by one of a Local Area Network (LAN), a Personal Area Network (PAN), a Wireless Local Area Network (WLAN), a Wireless Sensor Network (WSN), Wireless Area Network (WAN), Wireless Wide Area Network (WWAN), a Long Term Evolution (LTE) networks (for e.g. LTE-Advanced Pro), 5G New Radionetworks, ITU-IMT 2020 networks, a plain old telephone service (POTS), and a Metropolitan Area Network (MAN). Additionally, the wired channel may be selected on the basis of bandwidth criteria. For example, an optical fiber channel may be used for a high bandwidth communication. Further, a coaxial cable-based or Ethernet-based communication channel may be used for moderate bandwidth communication.

The system, apparatus, method and computer program product described above may be any of a wide variety of computing devices and may be embodied by either the same or different computing devices. The system, apparatus, etc. may be embodied by a server, a computer workstation, a distributed network of computing devices, a personal computer or any other type of computing device. The system, apparatus, method and computer program product may be configured to determine a driving decision may similarly be embodied by the same or different server, computer workstation, distributed network of computing devices, personal computer, or other type of computing device.

Alternatively, the system, apparatus, method and computer program product may be embodied by a computing device on board a vehicle, such as a computer system of a vehicle, e.g., a computing device of a vehicle that supports safety-critical systems such as the powertrain (engine, transmission, electric drive motors, etc.), steering (e.g., steering assist or steer-by-wire), and/or braking (e.g., brake assist or brake-by-wire), a navigation system of a vehicle, a control system of a vehicle, an electronic control unit of a vehicle, an autonomous vehicle control system (e.g., an autonomous-driving control system) of a vehicle, a mapping system of a vehicle, an Advanced Driver Assistance System (ADAS) of a vehicle), or any other type of computing device carried by the vehicle. Still further, the apparatus may be embodied by a computing device of a driver or passenger on board the vehicle, such as a mobile terminal, e.g., a personal digital assistant (PDA), mobile telephone, smart phone, personal navigation device, smart watch, tablet computer, or any combination of the aforementioned and other types of portable computer devices.

FIG. 2 illustrates a block diagram 200 of the system 102, exemplarily illustrated in FIG. 1, to learn parking restrictions of a region based on parking behaviors of vehicle parkers, in accordance with an example aspect. FIG. 2 is described in conjunction with elements from FIG. 1.

As shown in FIG. 2, the system 102 may comprise a processing means such as a processor 202, storage means such as a memory 204, a communication means, such as a network interface 206, an input/output (I/O) interface 208, and a machine learning model 210. The processor 202 may retrieve computer executable instructions that may be stored in the memory 204 for execution of the computer executable instructions. The system 102 may connect to the UE 104 via the I/O interface 208. The processor 202 may be communicatively coupled to the memory 204, the network interface 206, the I/O interface 208, and the machine learning model 210.

The processor 202 may comprise suitable logic, circuitry, and interfaces that may be configured to execute instructions stored in the memory 204. The processor 202 may obtain sensor data associated parking restrictions of a region based on parking behaviors of vehicle parkers. The sensor data may be captured by one or more UE, such as the UE 104. The processor 202 may be configured to determine raised features in the region of navigation, based on the sensor data. The processor 202 may be further configured to determine, using a trained machine learning model in conjunction with ground truth of the region, one or more potential locations of parking restrictions of a region based on parking behaviors of vehicle parkers, where the ground truth of a region comprises reliable driver statistics and unreliable driver statistics based on parking restrictions and parking outcomes.

Examples of the processor 202 may be an Application-Specific Integrated Circuit (ASIC) processor, a Complex Instruction Set Computing (CISC) processor, a central processing unit (CPU), an Explicitly Parallel Instruction Computing (EPIC) processor, a Very Long Instruction Word (VLIW) processor, and/or other processors or circuits. The processor 202 may implement a number of processor technologies known in the art such as a machine learning model, a deep learning model, such as a recurrent neural network (RNN), a convolutional neural network (CNN), and a feed-forward neural network, or a Bayesian model. As such, in some aspects, the processor 202 may include one or more processing cores configured to perform independently. A multi-core processor may enable multiprocessing within a single physical package.

Additionally, or alternatively, the processor 202 may include one or more processors configured in tandem via the bus to enable independent execution of instructions, pipelining and/or multithreading. Additionally, or alternatively, the processor 202 may include one or processors capable of processing large volumes of workloads and operations to provide support for big data analysis. However, in some cases, the processor 202 may be a processor specific device (for example, a mobile terminal or a fixed computing device) configured to employ an aspect of the disclosure by further configuration of the processor 202 by instructions for performing the algorithms and/or operations described herein.

In some aspects, the processor 202 may be configured to provide Internet-of-Things (IoT) related capabilities to users of the UE 104 disclosed herein. The IoT related capabilities may in turn be used to provide smart city solutions by providing parking restriction updates, big data analysis, and sensor-based data collection for providing navigation and parking recommendation services. The environment may be accessed using the I/O interface 208 of the system 102 disclosed herein.

The memory 204 may comprise suitable logic, circuitry, and interfaces that may be configured to store a machine code and/or instructions executable by the processor 202. The memory 204 may be configured to store information including processor instructions for training the machine learning model. The memory 204 may be used by the processor 202 to store temporary values during execution of processor instructions. The memory 204 may be configured to store different types of data, such as, but not limited to, sensor data from the UE 104. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 206 may comprise suitable logic, circuitry, and interfaces that may be configured to communicate with the components of the system 102 and other systems and devices in the network environment 100, via the network 110. The network interface 206 may communicate with the UE 104, via the network 110 under the control of the processor 202. In one aspect, the network interface 206 may be configured to communicate with the sensor unit 104C disclosed in the detailed description of FIG. 1. In an alternative aspect, the network interface 206 may be configured to receive the sensor data from the OEM cloud 106 over the network 110 as described in FIG. 1. In some example aspects, the network interface 206 may be configured to receive location information of a user associated with a UE (such as, the UE 104), via the network 110. In accordance with an aspect, a controller of the UE 104 may receive the sensor data from a positioning system (for example: a GPS based positioning system) of the UE 104. The network interface 206 may be implemented by use of known technologies to support wired or wireless communication of the system 102 with the network 110. Components of the network interface 206 may include, but are not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer circuit.

The I/O interface 208 may comprise suitable logic, circuitry, and interfaces that may be configured to operate as an I/O channel/interface between the UE 104 and different operational components of the system 102 or other devices in the network environment 100. The I/O interface 208 may facilitate an I/O device (for example, an I/O console) to receive an input (e.g., sensor data from the UE 104 for a time duration) and present an output to one or more UE (such as, the UE 104) based on the received input. In accordance with an aspect, the I/O interface 208 may obtain the sensor data from the OEM cloud 106 to store in the memory 202. The I/O interface 208 may include various input and output ports to connect various I/O devices that may communicate with different operational components of the system 102.

In example aspects, the I/O interface 208 may be configured to provide the data associated with predicting cancelled ride-hailing rides to the database 108A to update the map of a certain geographic region. In accordance with an aspect, a user requesting information in a geographic region may be updated about historical (or static) road features, real-time or historical weather conditions, point-of-interest opening times, etc. Examples of the input devices may include, but are not limited to, a touch screen, a keyboard, a mouse, a joystick, a microphone, and an image-capture device. Examples of the output devices may include, but are not limited to, a display, a speaker, a haptic output device or other sensory output devices.

In accordance with an aspect, the processor 202 may train the machine learning model 210 to learn parking restrictions of a region based on parking behaviors of vehicle parkers. In an aspect of the disclosure, the processor 202 may predict, based on the trained machine learning model in conjunction with ground truth of the region, learn parking restrictions of a region based on parking behaviors of vehicle parkers, including reliable parker historical statistics and unreliable parker historical statistics. In an aspect, a weighted linear regression model may be used to predict, based on the trained machine learning model in conjunction with ground truth of the region, parking restrictions of a region based on parking behaviors of vehicle parkers, including reliable parker historical statistics and unreliable parker historical statistics. In another aspect, a look-up table for predicting, based on the trained machine learning model in conjunction with ground truth of the region, parking restrictions of a region based on parking behaviors of vehicle parkers, including reliable parker historical statistics and unreliable parker historical statistics.

In another aspect, a machine learning model, such as trained machine learning model 210 discussed earlier, may be used to learn parking restrictions of a region based on parking behaviors of vehicle parkers. In accordance with an aspect, the trained machine learning model 210 may be trained offline to obtain a classifier model to automatically predict, using a trained machine learning model trained on ground truth of a region, parking restrictions of a region based on parking behaviors of vehicle parkers. For the training of the trained machine learning model 210, different feature selection techniques and classification techniques may be used. The system 102 may be configured to obtain the trained machine learning model 210 and the trained machine learning model 210 model may leverage historical information and real-time data to automatically predict, using a trained machine learning model trained on ground truth of a region, parking restrictions of a region based on parking behaviors of vehicle parkers, including reliable parker historical statistics and unreliable parker historical statistics. In one aspect, supervised machine learning techniques may be utilized where ground truth data is used to train the model for different scenarios and then in areas where there is not sufficient ground truth data, the trained machine learning model 210 can be used to predict features or results.

In an aspect, the trained machine learning model 210 may be complemented or substituted with a transfer learning model. The transfer learning model may be used when the contextual factors related to parking strictions in the area, such as a number of successful parking events in the region, on-street parking availability, a number of tickets received for parking violations, a number of times vehicles have been towed for parking violations, a number of vehicle damage incidents related to parking violations are unavailable, sparse, incomplete, corrupted or otherwise unreliable for learning parking restrictions of a region based on parking behaviors of vehicle, for predicting cancelled parking restrictions in a new region.

In accordance with an aspect, various data sources may provide the historical and real-time information on parking restrictions in an area as an input to the machine learning model 210. Examples of the machine learning model 210 may include, but not limited to, Decision Tree (DT), Random Forest, and Ada Boost. In accordance with an aspect, the memory 204 may include processing instructions for training of the machine learning model 210 with data set that may be real-time (or near real time) data or historical data. In accordance with an aspect, the data may be obtained from one or more service providers.

FIG. 3 illustrates an example map or geographic database 307, which may include various types of geographic data 340. The database may be similar to or an example of the database 108B. The data 340 may include but is not limited to node data 342, road segment or link data 344, map object and point of interest (POI) data 346, parking restriction data records 348, or the like (e.g., other data records 350 such as traffic data, sidewalk data, road dimension data, building dimension data, vehicle dimension/turning radius data, etc.). Other data records may include computer code instructions and/or algorithms for executing a trained machine learning model that is capable of learn parking restrictions of a region based on parking behaviors of vehicle parkers.

A profile of end user mobility graph and personal activity information may be obtained by any functional manner including those detailed in U.S. Pat. Nos. 9,766,625 and 9,514,651, both of which are incorporated herein by reference. This data may be stored in one of more of the databases discussed above including as part of the parking restriction data records 348 in some aspects. This data may also be stored elsewhere and supplied to the system 102 via any functional means.

In one aspect, the following terminology applies to the representation of geographic features in the database 307. A "Node"—is a point that terminates a link, a "road/line segment"—is a straight line connecting two points, and a "Link" (or "edge") is a contiguous, non-branching string of one or more road segments terminating in a node at each end. In one aspect, the geographic database 307 follows certain conventions. For example, links do not cross themselves and do not cross each other except at a node. Also, there are no duplicated shape points, nodes, or links. Two links that connect each other have a common node.

The geographic database 307 may also include cartographic data, routing data, and/or maneuvering data as well as indexes 352. According to some example aspects, the road segment data records may be links or segments representing roads, streets, or paths, as may be used in calculating a route or recorded route information for determination of parking restrictions in an area. The node data may be end points (e.g., intersections) corresponding to the respective links or segments of road segment data. The road link data and the node data may represent a road network, such as used by vehicles, cars, trucks, buses, motorcycles, bikes, scooters, and/or other entities.

Optionally, the geographic database 307 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The geographic database 307 can include data about the POIs and their respective locations in the POI records. The geographic database 307 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database can include event data (e.g., traffic incidents, construction activities, scheduled events, unscheduled events, etc.) associated with the POI data records or other records of the map database.

The geographic database 107 may be maintained by a content provider e.g., the map data service provider and may be accessed, for example, by the content or service provider processing server. By way of example, the map data service provider can collect geographic data and dynamic data to generate and enhance the map database and dynamic data such as weather- and traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LiDAR, can be used to generate map geometries directly or through machine learning as described herein. However, the most ubiquitous form of data that may be available is vehicle data provided by vehicles, such as mobile device, as they travel the roads throughout a region.

The geographic database 307 may be a master map database, such as an HD map database, stored in a format that facilitates updates, maintenance, and development. For example, the master map database or data in the master map database can be in an Oracle spatial format or other spatial format (e.g., accommodating different map layers), such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the geographic database 307 may be a master geographic database, but in alternate aspects, a client-side map database may represent a compiled navigation database that may be used in or with end user devices to provide navigation and/or map-related functions. For example, the map database may be used with the mobile device to provide an end user with navigation features. In such a case, the map database can be downloaded or stored on the end user device which can access the map database through a wireless or wired connection, such as via a processing server and/or a network, for example.

The records for parking restriction data records 348 may include various points of data such as, but not limited to: a number of successful parking events in the region, on-street parking availability, a number of tickets received for parking violations, a number of times vehicles have been towed for parking violations, a number of vehicle damage incidents related to parking violations, etc.

FIG. 4 illustrates a flowchart 400 for acts taken in an exemplary method for learn parking restrictions of a region based on parking behaviors of vehicle parkers, in accordance with an aspect. More, fewer or different steps may be provided. FIG. 4 is explained in conjunction with FIG. 1 to FIG. 3. The control starts at act 402.

At act 402, the system 102 may determining one or more contextual factors related to a user parking a vehicle in the region. In an aspect, the one or more contextual factors may include a number of successful parking events in the region, on-street parking availability, a number of tickets received for parking violations, a number of times vehicles have been towed for parking violations, a number of vehicle damage incidents related to parking violations, etc.

At act 404, the system 102 may compute a parking trust index based on the one or more contextual factors related to a user parking a vehicle in a region. In an aspect, the system 102 may obtain a mobility graph of the user parking a vehicle in a region and compute the parking trust index based on the mobility graph.

In an aspect, the system 102 may, when computing the parking trust index based on the mobility graph, assign a higher weight to parking in a local area of the user when computing the parking trust index.

At act 406, the system 102 may classify the user as a reliable parker if the parking trust index is greater than a reliability threshold and classify the user as an unreliable parker if the parking trust index is less than a reliability threshold. In an aspect, the reliability threshold may be based on local parking rules of the region. In an aspect the reliability threshold may be determined by user risk preference or avoidance, or contextual factors related to the user's mobility graph or current preferences and/or situations. For example, the reliability threshold for a user in a hurry to make a quick drop-off of a package may set the reliability threshold differently from a user intending to park for a long period.

At act 408, the system 102 may determine the parking restrictions of the area based on a parking behavior of the reliable parker and/or a parking behavior of the unreliable parker.

FIG. 5A illustrates a flowchart 500 for acts taken in an exemplary method for learning parking restrictions of a region based on parking behaviors of vehicle parkers, in accordance with an aspect, where information based on unreliable parkers is suppressed or not incorporated into the algorithm to learn parking restrictions.

In act 502, the system 102 may disregard the parking behavior of the unreliable parkers.

In act 504, the system 102 may obtain historical parking statistics of the reliable parkers, as described in relation to FIG. 4.

In act 506, the system 102 may remove indoor parking statistics of the reliable parker from the historical parking statistics of the reliable parker to calculate reliable parking statistics.

In act 508, the system 102 may process the reliable parking statistics to determine restricted street parking areas.

FIG. 5B illustrates a flowchart 510 for acts taken in an exemplary method for learning parking restrictions of a region based on parking behaviors of vehicle parkers, in accordance with an aspect, where information based on unreliable parkers is included in the algorithm to learn parking restrictions, especially unreliable parking data with a very low parking trust index.

In act 512, the system 102 may include the parking behavior of an unreliable parker with a low parking trust index to obtain unreliable parking statistics. It may be that these unreliable parkers may almost always park in improper, restricted locations. The data processing may be similar to the approach using only reliable parking statistics, but data from all unreliable parkers is used here as well, especially when those unreliable parkers have a very low Parking Trust Index.

It may occur that some jobs do not allow users to find proper parking spaces in a busy area due to the emergency of the situation (e.g., emergency doctors, water leakage, etc) while some others "can't afford" to take the time to park properly due to intensity of the job (e.g. deliveries). Some others are just careless and always take the first randomly available spot, with the chance of getting a fine. The approach of including some unreliable parking data may aim to identify those spots taken by "careless" drivers.

If data shows that those spots are only taken by those "careless" drivers, then they are very likely not proper parking spots and drivers should be careful when parking there.

In act 514, the system 102 may process these unreliable parking statistics, along with the reliable parking statistics, to determine restricted street parking areas.

Advantages of the disclosed system to learn parking restrictions based on reliable parker data may include frictionless parking, to avoid cars parking in odd or inconvenient positions/angles such that other cars may risk being damaged by parking near these cars. Implementation of the system and method may produce less traffic due to people searching for parking in a legal, unrestricted area. In addition, the disclosed system and method may result in improved user experience, especially for users, including those in AVs, who are entering unfamiliar areas where the locations of restricted parking may not be known.

Blocks of the flowcharts 400, 500 and 510 support combinations of means for performing the specified functions and combinations of operations for performing the specified functions for performing the specified functions. It will also be understood that one or more blocks of the flowcharts 400, 500 and 510, and combinations of blocks in the flowcharts 400, 500 and 510, can be implemented by special purpose hardware-based computer systems which perform the specified functions, or combinations of special purpose hardware and computer instructions.

Alternatively, the system may comprise means for performing each of the operations described above. In this regard, according to an example aspect, examples of means for performing operations may comprise, for example, the processor 202 and/or a device or circuit for executing instructions or executing an algorithm for processing information as described above.

Although the aforesaid description of FIGS. 1-5A,B is provided with reference to the sensor data, however, it may be understood that the disclosure would work in a similar manner for different types and sets of data as well. The system 102 may generate/train the machine learning model 210 to evaluate different sets of data at various geographic locations. Additionally, or optionally, the determined personalized planning recommendation may be provided to an end user, as an update which may be downloaded from the mapping platform 110. The update may be provided as a run time update or a pushed update.

It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 14 of an apparatus 10 employing an aspect of the present disclosure and executed by the processing circuitry 12. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other aspects of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific aspects disclosed and that modifications and other aspects are intended to be included within the scope of the appended claims. Furthermore, in some aspects, additional optional operations may be included. Modifications, additions, or amplifications to the operations above may be performed in any order and in any combination.

Moreover, although the foregoing descriptions and the associated drawings describe example aspects in the context of certain example combinations of elements and/or functions, it should be appreciated that different combinations of elements and/or functions may be provided by alternative aspects without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A computer-implemented method to learn parking restrictions of a region based on parking behaviors of vehicle parkers, the method comprising: determining one or more contextual factors related to a user parking a vehicle in the region; computing a parking trust index based on the one or more contextual factors related to a user parking a vehicle in a region; classifying the user as a reliable parker if the parking trust index is greater than a reliability threshold and classifying the user as an unreliable parker if the parking trust index is less than a reliability threshold; obtain sensor data associated parking restrictions of a region based on parking behaviors of vehicle parkers; wherein the sensor data captured by one or more UE (user equipment) and determining the parking restrictions of the area based on disregarding the parking behavior of the unreliable parker, obtaining historical parking statistics of the reliable parker, removing indoor parking statistics of the reliable parker from the historical parking statistics of the reliable parker to calculate reliable parking statistics, and processing the reliable parking statistics to determine restricted street parking areas; and obtaining a mobility graph of the user parking a vehicle in a region and computing the parking trust index based on the mobility graph.

2. The method of claim 1, where the one or more contextual factors comprises a number of successful parking events in the region, on-street parking availability, a number of tickets received for parking violations, a number of times vehicles have been towed for parking violations, a number of vehicle damage incidents related to parking violations or a combination thereof.

3. The method of claim 1, where computing the parking trust index based on the mobility graph comprises assigning a higher weight to parking in a local area of the user when computing the parking trust index.

4. The method of claim 1, where the reliability index is based on local parking rules of the region.

5. The method of claim 1, where determining the parking restrictions of the area further comprises: including the parking behavior of an unreliable parker with a low parking trust index to obtain unreliable parking statistics; and processing the unreliable parking statistics to determine restricted street parking areas.

6. A system to learn parking restrictions of a region based on parking behaviors of vehicle parkers, comprising: at least one memory configured to store computer executable instructions; and at least one processor configured to execute the computer executable instructions to: determine one or more contextual factors related to a user parking a vehicle in the region; compute a parking trust index based on the one or more contextual factors related to a user parking a vehicle in a region; classify the user as a reliable parker if the parking trust index is greater than a reliability threshold and classify the user as an unreliable parker if the parking trust index is less than a reliability threshold; obtain sensor data associated parking restrictions of a region based on parking behaviors of vehicle parkers; wherein the sensor data captured by one or more UE (user equipment) and determine the parking restrictions of the area based on disregarding the parking behavior of the unreliable parker, obtaining historical parking statistics of the reliable parker, removing indoor parking statistics of the reliable parker from the historical parking statistics of the reliable parker to calculate reliable parking statistics, and processing the reliable parking statistics to determine restricted street parking areas; and obtaining a mobility graph of the user parking a vehicle in a region and computing the parking trust index based on the mobility graph.

7. The system of claim 6, where the one or more contextual factors comprises a number of successful parking events in the region, on-street parking availability, a number of tickets received for parking violations, a number of times vehicles have been towed for parking violations, a number of vehicle damage incidents related to parking violations or a combination thereof.

8. The system of claim 6, where the computer executable instructions to compute the parking trust index based on the mobility graph comprise computer executable instructions to assign a higher weight to parking in a local area of the user when computing the parking trust index.

9. The system of claim 6, where a reliability index is based on local parking rules of the region.

10. The system of claim 6, where the computer executable instructions to determine the parking restrictions of the area further comprises computer executable instructions to: include the parking behavior of an unreliable parker with a low parking trust index to obtain unreliable parking statistics; and process the unreliable parking statistics to determine restricted street parking areas.

11. A computer program product comprising a non-transitory computer readable medium having stored thereon computer executable instructions, which when executed by one or more processors, cause the one or more processors to carry out operations to learn parking restrictions of a region based on parking behaviors of vehicle parkers, the operations comprising: determining one or more contextual factors related to a user parking a vehicle in the region; computing a parking trust index based on the one or more contextual factors related to a user parking a vehicle in a region; classifying the user as a reliable parker if the parking trust index is greater than a reliability threshold and classifying the user as an unreliable parker if the parking trust index is less than a reliability threshold; obtain sensor data associated parking restrictions of a region based on parking behaviors of vehicle parkers; wherein the sensor data captured by one or more UE (user equipment) and determining the parking restrictions of the area based on disregarding the parking behavior of the unreliable parker, obtaining historical parking statistics of the reliable parker, removing indoor parking statistics of the reliable parker from the historical parking statistics of the reliable parker to calculate reliable parking statistics, and processing the reliable parking statistics to determine restricted street parking areas; and obtaining a mobility graph of the user parking a vehicle in a region and computing the parking trust index based on the mobility graph.

* * * * *